US009872241B2

(12) United States Patent
Goto (10) Patent No.: US 9,872,241 B2
(45) Date of Patent: Jan. 16, 2018

(54) COMMUNICATION DEVICE, METHOD FOR CONTROLLING COMMUNICATION DEVICE, AND PROGRAM FOR SERVICE SEARCH PERFORMED IN COMMUNICATION LAYERS

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 14/787,246

(22) PCT Filed: Apr. 28, 2014

(86) PCT No.: PCT/JP2014/002357
§ 371 (c)(1),
(2) Date: Oct. 26, 2015

(87) PCT Pub. No.: WO2014/178185
PCT Pub. Date: Nov. 6, 2014

(65) Prior Publication Data
US 2016/0073334 A1 Mar. 10, 2016

(30) Foreign Application Priority Data

May 1, 2013 (JP) .................................. 2013-096410

(51) Int. Cl.
*H04W 48/18* (2009.01)
*H04W 88/06* (2009.01)
(Continued)

(52) U.S. Cl.
CPC ............. *H04W 48/18* (2013.01); *H04L 41/12* (2013.01); *H04L 67/16* (2013.01); *H04W 8/005* (2013.01); *H04W 4/001* (2013.01); *H04W 88/06* (2013.01)

(58) Field of Classification Search
None
See application file for complete search history.

(56) References Cited

U.S. PATENT DOCUMENTS 9,356,804 B1 * 5/2016 Passaglia ............ H04L 12/5692
2007/0141988 A1 * 6/2007 Kuehnel ............... H04W 8/005
455/41.2

(Continued)

FOREIGN PATENT DOCUMENTS

JP 2011-35768 A 2/2011
JP 2012-522461 A 9/2012
(Continued)

*Primary Examiner* — Robert C Scheibel
(74) *Attorney, Agent, or Firm* — Canon USA, Inc., IP Division (57) ABSTRACT

The present invention relates to improvement of convenience in displaying service search results when service search is performed in different communication layers.
A communication device of the present invention includes the steps of presenting a plurality of options including a first option for specifying a service to be executed and performing wireless communication and a second option for specifying a connected party and performing wireless communication; and selecting a wireless communication mode to be executed from wireless communication modes corresponding to the plurality of options including the first option and the second option.

20 Claims, 7 Drawing Sheets

(51) Int. Cl.
*H04L 29/08* (2006.01)
*H04W 8/00* (2009.01)
*H04L 12/24* (2006.01)
*H04W 4/00* (2009.01)

(56) References Cited

U.S. PATENT DOCUMENTS

| | | | |
|---|---|---|---|
| 2007/0201384 A1 | 8/2007 | Cunningham | |
| 2009/0239469 A1* | 9/2009 | Rangarajan | H04L 67/16 455/41.2 |
| 2011/0010246 A1 | 1/2011 | Kasslin | |
| 2011/0149806 A1* | 6/2011 | Verma | H04L 12/2809 370/255 |
| 2013/0170482 A1* | 7/2013 | Jung | H04W 8/005 370/338 |
| 2014/0044114 A1* | 2/2014 | Lee | H04W 76/023 370/338 |
| 2014/0115025 A1* | 4/2014 | Taoka | H04L 67/34 709/201 |
| 2014/0178034 A1* | 6/2014 | Kim | H04N 5/765 386/230 |
| 2014/0258395 A1* | 9/2014 | Tng | H04L 67/16 709/204 |
| 2014/0314065 A1* | 10/2014 | Song | H04W 8/005 370/338 |
| 2015/0071147 A1* | 3/2015 | Yamaura | H04M 1/7253 370/311 |
| 2015/0215861 A1* | 7/2015 | Kim | H04W 4/005 370/338 |
| 2015/0327313 A1* | 11/2015 | Kim | H04W 80/10 370/329 |
| 2015/0334638 A1* | 11/2015 | Kim | H04W 48/14 370/329 |

FOREIGN PATENT DOCUMENTS

| | | |
|---|---|---|
| WO | 2007/005131 A2 | 1/2007 |
| WO | 2012/083080 A2 | 6/2012 |
| WO | 2013/025075 A2 | 2/2013 |

* cited by examiner

COMMUNICATION DEVICE, METHOD FOR CONTROLLING COMMUNICATION DEVICE, AND PROGRAM FOR SERVICE SEARCH PERFORMED IN COMMUNICATION LAYERS

TECHNICAL FIELD

The present invention relates to a communication device, a method for controlling the communication device, and a program for the same.

BACKGROUND ART

In recent years, an increasing number of electronic devices, such as digital cameras and printers, have a wireless-LAN station function and are used as communication devices connected to a wireless LAN. For example, PTL 1 discloses a method for facilitating sharing of images by using a wireless LAN function of a digital camera.

Furthermore, Wi-Fi Alliance established a Wi-Fi Direct (registered trademark) standard. Wi-Fi Direct defines a protocol for determining whether individual electronic devices operate as a wireless-LAN access point or a wireless LAN station. Executing the protocol allows automatic determination of what electronic device serves as a wireless-LAN access point and what electronic device serves as a wireless LAN station, thus improving user convenience.

Wi-Fi Direct also defines the function of advertising and discovering information about services that upper-layer applications support as an optional function (service discovery function). This service discovery function allows the user to know information on services that a connected party holds before executing a connecting process, thus improving user convenience.

However, since the service discovery of Wi-Fi Direct (registered trademark) is an optional function, electronic devices cannot receive responses to a service search from devices that do not support the function. A conceivable method for obtaining service information from such devices that do not support service discovery is using a technique for advertising and searching for information on services executed in a communication layer higher than a wireless communication layer in which service discovery is performed. An example of the technique for advertising and searching for information on services executed in a communication layer higher than that for service discovery is Universal Plug and Play (UPnP (registered trademark)).

The above-mentioned service discovery allows a device to exchange information on services offered by the device and a partner communication device with the partner communication device by transmitting and receiving an action frame (GAS frame) defined in IEEE802.11u. Accordingly, even before performing a communication connection process for setting communication parameters, such as an IP address, necessary for communication in a layer higher than a wireless communication layer, service information can be exchanged with communication devices present in a wireless communication area. In contrast, for example, a technique for advertising and searching for information on services executed in a communication layer higher than that for service discovery, such as UPnP (registered trademark), needs to perform a connection process for setting communication parameters, such as an IP address, necessary for communication in a layer higher than a wireless communication layer. Accordingly, the timing at which a service search result is obtained using the UPnP (registered trademark) or the like is later than that of service discovery by an amount corresponding to the communication connecting process.

In such a case where a plurality of communication modes that need different processes, e.g., service searches in different communication layers are present, selection of a communication mode for improving user convenience is not under consideration in the related art.

CITATION LIST

Patent Literature

PTL 1: Japanese Patent Laid-Open No. 2011-35768

SUMMARY OF INVENTION

Solution to Problem

A communication device of the present invention includes the steps of presenting a plurality of options including a first option for specifying a service to be executed and performing wireless communication and a second option for specifying a connected party and performing wireless communication; and selecting a wireless communication mode to be executed from wireless communication modes corresponding to the plurality of options including the first option and the second option.

Further features of the present invention will become apparent from the following description of exemplary embodiments with reference to the attached drawings.

DESCRIPTION OF EMBODIMENTS

The following embodiments disclose a communication system in which, if a plurality of communication modes that need different processes are present, e.g., service searches in different communication layers, a communication mode is selected so that user convenience is improved.

First Embodiment

A communication device (hereinafter also referred to as a first communication device) according to a first embodiment will be specifically described with reference to the drawings. Although the following embodiment uses a wireless LAN system conforming to IEEE802.11 series, the wireless LAN system conforming to IEEE802.11 may not necessarily be used for communication.

The communication device according to the first embodiment has a service discovery function defined in Wi-Fi Direct and the function of advertising and searching for information on services executed in a communication layer higher than that for service discovery. The service discovery allows a first communication device to exchange, with a partner communication device (hereinafter also referred to as a second communication device), information on services that the first and second communication devices have by transmitting and receiving an action frame (GAS frame) defined in IEEE802.11u. Accordingly, even before performing a communication connection process for setting communication parameters, such as an IP address, necessary for communication in a layer higher than a wireless communication layer, service information can be exchanged with communication devices present in a wireless communication area. In contrast, for example, a technique for advertising and searching for information on services executed in a communication layer higher than that for service discovery, such as UPnP (registered trademark), needs to perform a connection process for setting communication parameters, such as an IP address, necessary for communication in a layer higher than a wireless communication layer. Accordingly, the timing at which a service search result is obtained using the UPnP (registered trademark) or the like is later than that of service discovery by an amount corresponding to the communication connecting process.

As described above, although service discovery allows a communication device to obtain service information on second communication devices before performing a connection process, not all communication devices support the function because service discovery is an optional function. In contrast, when service information is to be obtained in a higher communication layer, such as UPnP (registered trademark), the service information can be obtained also from devices that do not support service discovery. However, the service search process in a higher communication layer, such as UPnP (registered trademark), can be executed only after a wireless connection is established. This causes a problem in that, in particular, if there are a plurality of other communication devices, it takes a lot of tome to collect service information from all the communication devices.

The first embodiment informs a user of service search results in the case where service searches are performed in different communication layers depending on user's selection of a communication mode so that the convenience is improved.

Figure 1:
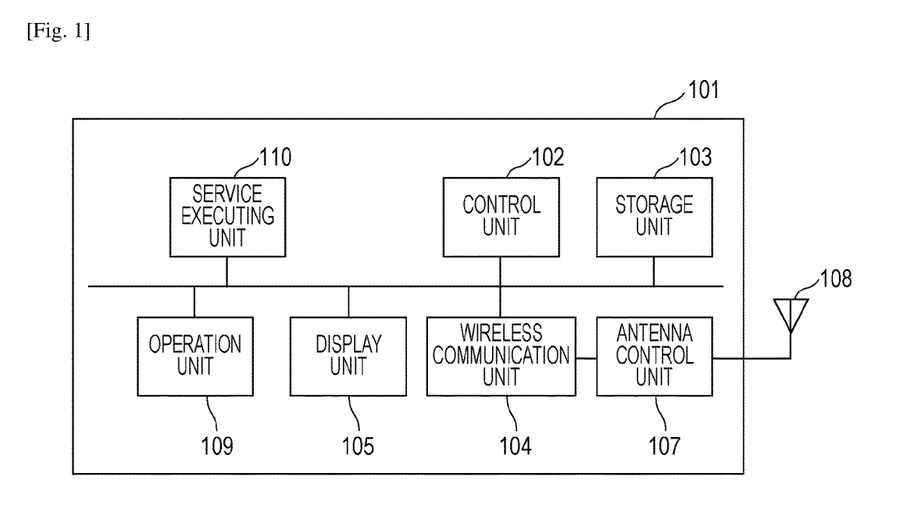
FIG. 1 is a block diagram illustrating an example hardware configuration of a communication device.

The hardware configuration of a communication device in an example of the first embodiment will be described. FIG. 1 is a block diagram illustrating an example of the configurations of devices described later. In FIG. 1, reference sign 101 denotes a communication device. Reference sign 102 denotes a control unit that controls the whole of the communication device 101 by executing a control program stored in a storage unit 103. An example of the control unit 102 is a central processing unit (CPU).

Reference sign 103 denotes a storage unit that stores the control program that the control unit 102 executes and various items of information, such as communication parameters. Operations described later are performed by the control unit 102 executing the control program stored in the storage unit 103.

Reference sign 104 denotes a wireless communication unit for performing wireless LAN communication conforming to IEEE802.11 series. Reference sign 105 denotes a display unit that performs various displays. The display unit 105 has the function of outputting visually perceivable information, such as LCDs and LEDs, or the function of outputting sound, such as speakers. The display unit 105 has the function of outputting at least one of visual information and audio information. For visual information, the display unit 105 includes a video RAM (VRAM) that holds image data corresponding to visual information to be displayed. The display unit 105 performs display control to continuously display image data stored in the VRAM on a LCD or LED.

Reference sign 107 denotes an antenna control unit. Reference sign 108 denotes an antenna. Reference sign 109 denotes an operation unit for the user to make various inputs, thereby operating the communication device 101. The operation unit 109 stores flags corresponding to inputs in a memory, such as the storage unit 103. A service executing unit 110 has the function of executing services in an application level that the communication device 101 provides. For example, if the communication device 101 is a printer and is capable of executing a printing service, the service executing unit 110 is hardware for executing the printing service, such as a print engine. For example, if the communication device 101 is a digital camera and is capable of executing an image (moving-image) delivery service, the service executing unit 110 is hardware, such as an image sensor or a lens. FIG. 1 shows merely an example; the communication device 101 may have a hardware configuration other than that shown in FIG. 1.

Figure 2:
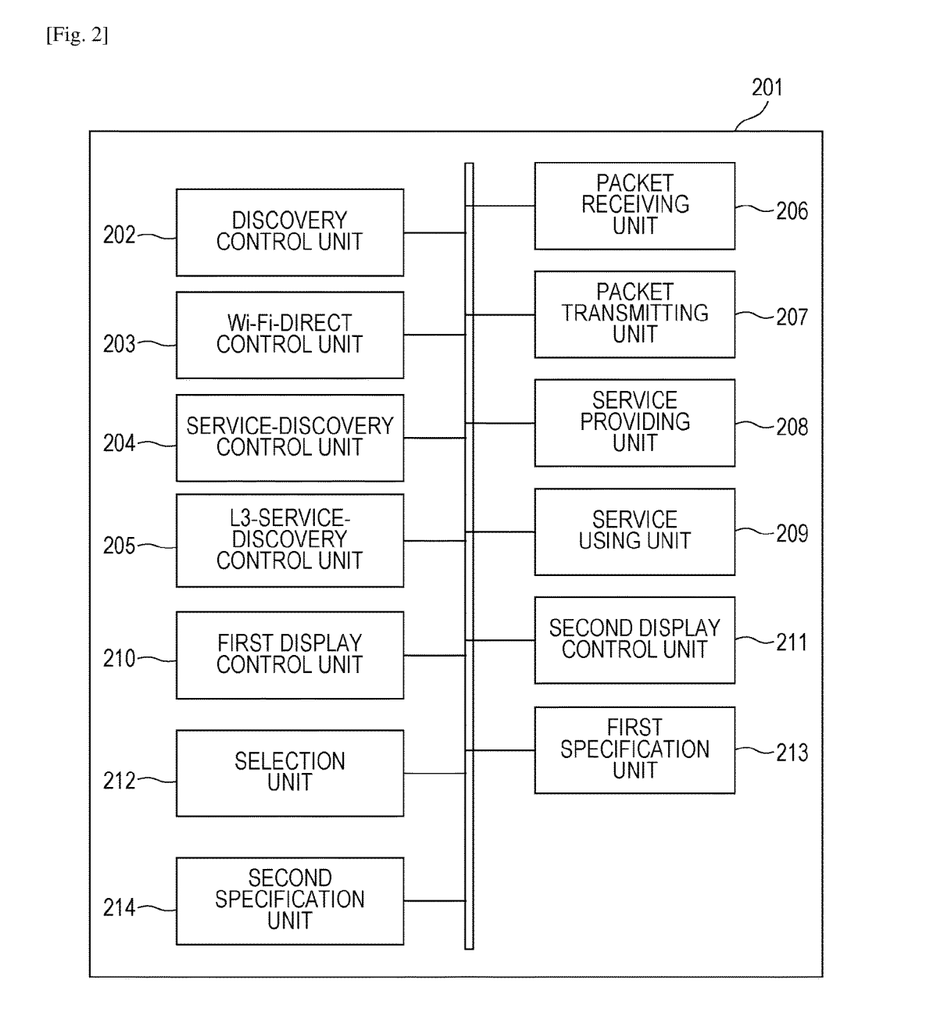
FIG. 2 is a block diagram illustrating an example software configuration of the communication device.

FIG. 2 is a block diagram illustrating an example configuration of functional blocks for executing the processes and communication control functions shown in flowcharts and sequence diagrams described later. The functional configuration shown in FIG. 2 is implemented by the control unit 102 executing the control program, operations and processing of information, and control of the hardware. Reference sign 201 denotes the whole of the functional blocks. Reference sign 202 denotes a discovery control unit, which executes a search process for searching for partner communication devices. The discovery control unit 202 controls the wireless communication unit 104, the antenna control unit 107, and the antenna 108 to transmit a probe request defined in IEEE802.11. The discovery control unit 202 searches for second communication devices by receiving a probe response, which is a response signal to the probe request. Furthermore, the discovery control unit 202 searches for second communication devices depending on whether or not beacons transmitted from the second communication devices are present.

Reference sign 203 denotes a Wi-Fi Direct control unit. The Wi-Fi Direct control unit 203 performs control based on Wi-Fi Direct protocol specifications. In Wi-Fi Direct, a communication device that implements a wireless-LAN access point function is called a P2P group owner (hereinafter referred to as GO), and a communication device that implements a wireless-LAN station function is called a P2P client (hereinafter referred to as CL). These roles are determined depending on a GO negotiation protocol. In Wi-Fi Direct, a network that GO constitutes is called a P2P group. In other words, a GO and a CL connected to the GO are collectively called a P2P group. A network in this specification is sometimes referred to as a P2P group. Both are described in the same sense.

In this specification, the P2P group owner (GO), the P2P client (CL), and communication devices whose roles are not yet determined are collectively referred to as P2P devices. The P2P devices can either participate in a wireless network (CL function) or constitute a wireless network (GO function). The roles of the P2P devices are automatically determined by executing the protocol of Wi-Fi Direct. The P2P devices each serve as a determined function and perform wireless connection or wireless communication. For connection between devices using Wi-Fi Direct, communication parameters are provided from GO to CL, and the communication parameters are used in connection. The communication parameters include various wireless communication parameters for wireless communication conforming to the IEEE802.11 standard. Specifically, the communication parameters include wireless communication parameters necessary for wireless LAN communications, such as an SSID serving as a network identifier, an encryption key, an authentication system, and an authentication key. The communication parameters further include an IP address for performing communication in an IP layer.

Reference sign 204 denotes a service-discovery control unit, which controls a service discovery function. The service discovery function can exchange service information with a partner communication device by transmitting and receiving an action frame (GAS frame) defined in IEEE802.11u. The service-discovery control unit 204 performs a service search process based on a GAS protocol. The GAS is an abbreviation for Generic Advertisement Service. Specifically, when searching for the attributes of second communication devices or corresponding services. The service-discovery control unit 204 transmits an "SD Query" frame (GAS Initial Request), which is a service search signal. The service-discovery control unit 204 receives an "SD Response" frame, which is a response to the SD Query, from a partner communication device. Alternatively, the service-discovery control unit 204 receives an SD Query frame from a partner communication device and transmits an SD Response frame as a response. The transmission and reception of the frames allow detection of the attributes of the second communication device and executable services. Furthermore, the service-discovery control unit 204 can advertise services that the communication device 101 can execute to the second communication devices. If no response to the transmitted SD Query comes back, it can be determined whether the second communication devices support a service discovery function, which is an optional function of Wi-Fi Direct. Specifically, the service-discovery control unit 204 executes, in a communication layer for wireless communication, a device service search for detecting the attribute information on the second communication devices present in a wireless communication area. The service-discovery control unit 204 performs, in a first communication layer, a first detection process for detecting the attributes of the second communication devices. The first embodiment uses a data link layer in an OSI reference model as an example of the first communication layer; however, it is not limited thereto.

Examples of the service search process using the SD Query frame include a search of specifying a desired service and obtaining a response from a device that can execute the desired service and a search of specifying no desired service and obtaining service information on all services that the second communication device can execute.

The service information includes information on a protocol used to perform service and service-function support information indicating support for essential service functions and support for optional functions. For example, it can be determined from service information received from a second communication device whether the second communication device can execute a predetermined service (for example, whether it supports a printing service). Furthermore, a protocol can be evaluated for a second communication device to perform a predetermined service (for example, whether a printing service using PictBridge can be executed can be determined) from service information received from the second communication device. Furthermore, service-function support information can be evaluated for a second communication device to perform a predetermined service (for example, whether two-sided printing, color or monochrome printing, or format printing is supported can be determined) from service information received from the second communication device. It is needless to say that these specific examples are not intended to limit the present invention but examples merely for better understanding.

Reference sign 205 denotes an L3-service-discovery control unit (hereinafter referred to as an L3-SD control unit 205), which controls the function of advertising and searching for service information in a network layer (layer 3) in an OSI reference model. The function of the L3-SD control unit 205 to advertise and search for service information can be implemented by using the technique, Universal Plug and Play (UPnP (registered trademark)) or Bonjour (registered trademark). The function of the L3-SD control unit 205 to advertise and search for service information can be implemented by using Multicast Domain Name System (mDNS) in Bonjour. In other words, the L3-SD control unit 205 can transmit and receive service information in a second communication layer different from the first communication layer in which the service-discovery control unit 204 transmits and receives service information to and from a second communication device. In other words, even if a partner communication device does not support the service discovery function, which is an optional function of Wi-Fi Direct, the L3-SD control unit 205 can transmit and receive service information to and from the partner communication device provided that it supports UPnP or Bonjour. Although the first embodiment is described in which the second communication layer is a network layer, it is only required that the second communication layer be higher than the first communication layer.

The L3-SD control unit 205 can notify second communication devices of a service that the first communication device can provide (process type) as in the case of advertisement and search for service information performed by the service-discovery control unit 204. Furthermore, the L3-SD control unit 205 can obtain services that second communication devices can provide (process type). Service information that the service-discovery control unit 204 transmits or receives and service information that the L3-SD control unit 205 transmits or receives may be either the same or different.

Also the service search process of the L3-SD control unit 205 includes a search specifying a desired service and a search specifying no desired service. For the service search process, the L3-SD control unit 205 transmits a search signal in the second communication layer.

Reference sign 206 denotes a packet receiving unit, and reference sign 207 denotes a packet transmitting unit, which control transmission and reception of all packets including a communication protocol for a higher layer. Reference sign 208 denotes a service providing unit in an application layer. The application layer here refers to a communication layer in which communication for providing a service in a fifth or higher layer in an OSI reference model. Specifically, the service providing unit 208 controls communication for providing services, such as a printing function, an image streaming function, and a file transfer function, to a second communication device and controls the service executing unit 110.

Reference sign 209 denotes a service using unit in the application layer. The service using unit 209 controls communication for services provided from a partner communication device by communication in the application layer. Specifically, the service using unit 209 controls, for example, the function of transmitting prints to a printing-service providing device and the function of transmitting moving images to a digital display, and controls the service executing unit 110. Reference sign 210 denotes a first display control unit, which performs display control to cause the display unit 105 to display a service detection result obtained by the service-discovery control unit 204. Reference sign 211 denotes a second display control unit, which performs display control to cause the display unit 105 to display a service search result obtained by the L3-SD control unit 205. A selection unit 212 presents, to the display unit 105, at least a first option for specifying a service to be executed and performing wireless communication and a second option for specifying a connected party and performing wireless communication. The selection unit 212 selects one of the displayed options on the basis of user input to the operation unit 109. A first specification unit 213 receives specification of a connected party from among a plurality of second communication devices detected by the discovery control unit 202 on the basis of a user operation on the operation unit 109. A second specification unit 214 receives specification of a service to be executed from the service information on the second communication devices detected by the service-discovery control unit 204 or the L3-SD control unit 205 on the basis of a user operation on the operation unit 109.

All the functional blocks have mutual relationship in terms of software or hardware. The above functional blocks are merely an example; a plurality of functional blocks may constitute one functional block, or some of the functional blocks may be divided into a plurality of functional blocks. The above functional blocks may be implemented by hardware.

Figure 3:
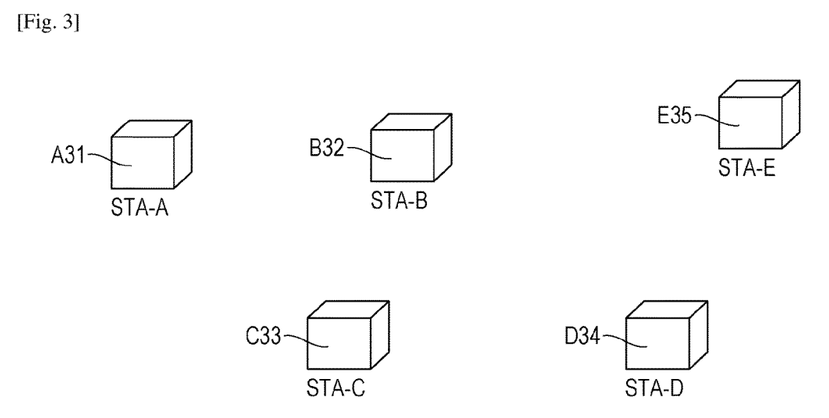
FIG. 3 is a diagram illustrating an example network configuration of a first embodiment.

Next, the operation of a communication device having the above configuration will be described. FIG. 3 illustrates five communication devices, that is, a communication device A31 (STA-A), a communication device B32 (STA-B), a communication device C33 (STA-C), a communication device D34 (STA-D), and a communication device E35 (STA-E). The communication device A31, the communication device C33, and the communication device D34 have the configuration in FIGS. 1 and 2 described above. The communication device B32 is a Wi-Fi Direct incompatible device. The communication device E35 is a Wi-Fi Direct compatible device but does not support GAS. In other words, the communication device E35 does not support a service discovery function in a wireless communication layer.

Figure 4:
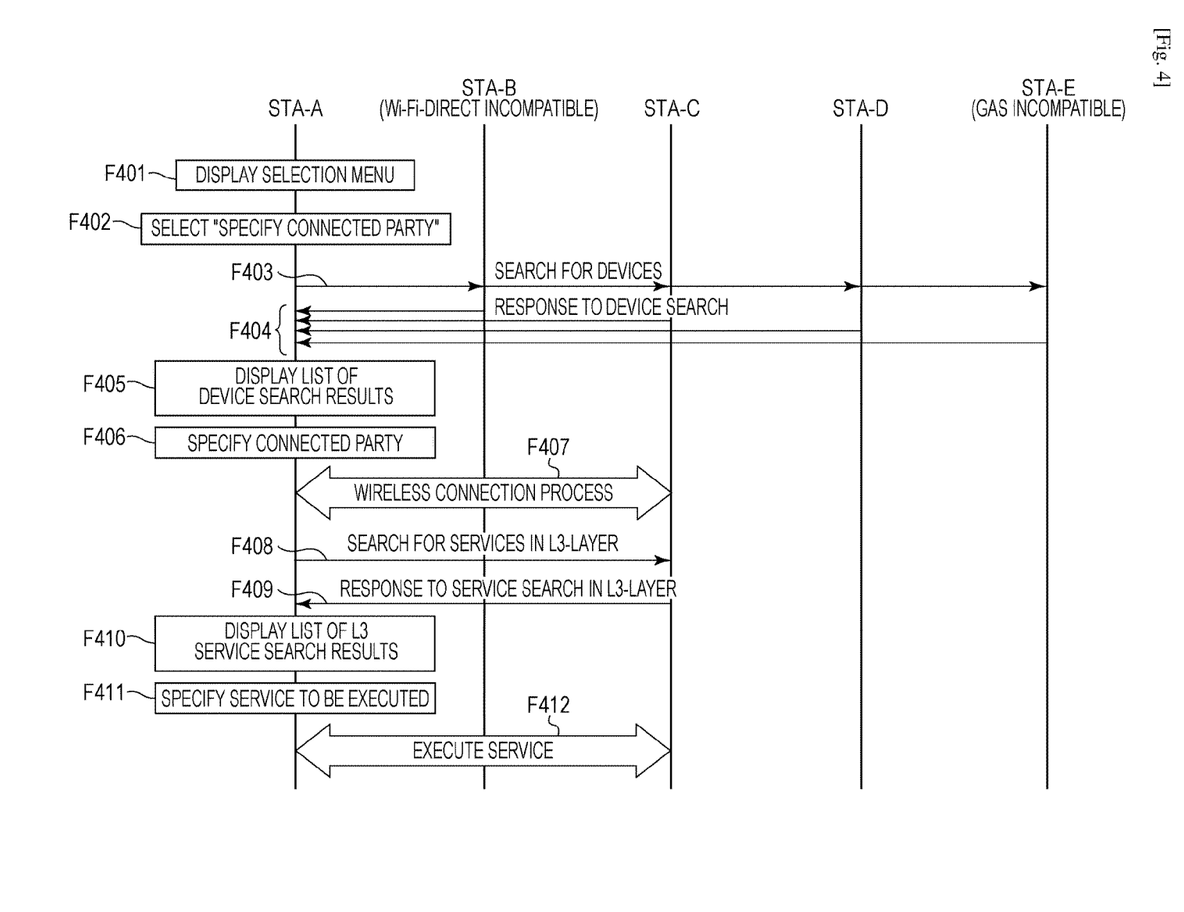
FIG. 4 is a sequence diagram of an operation of the communication device of the first embodiment.
Figure 5:
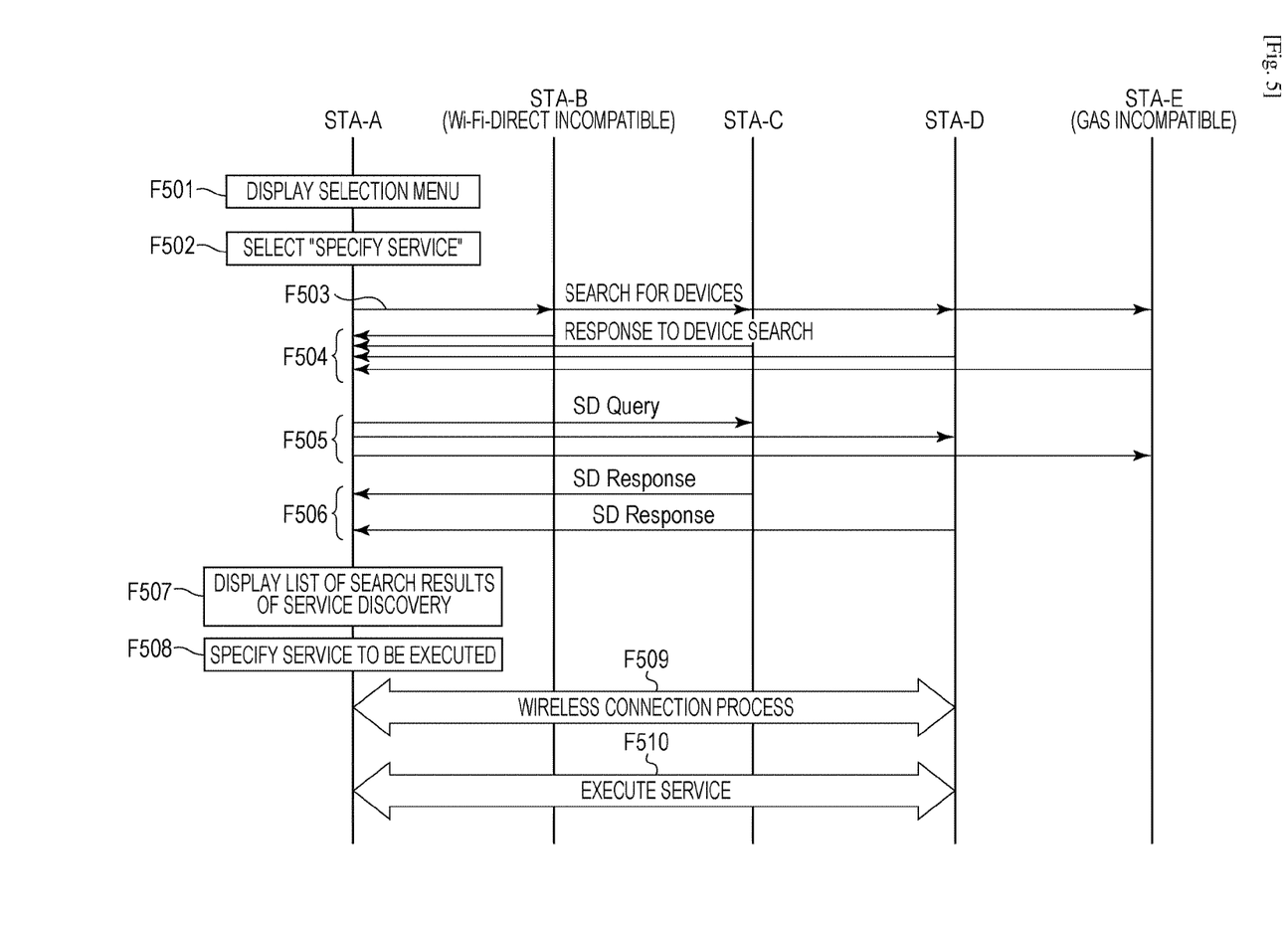
FIG. 5 is a sequence diagram of an operation of the communication device of the first embodiment.
Figure 7:
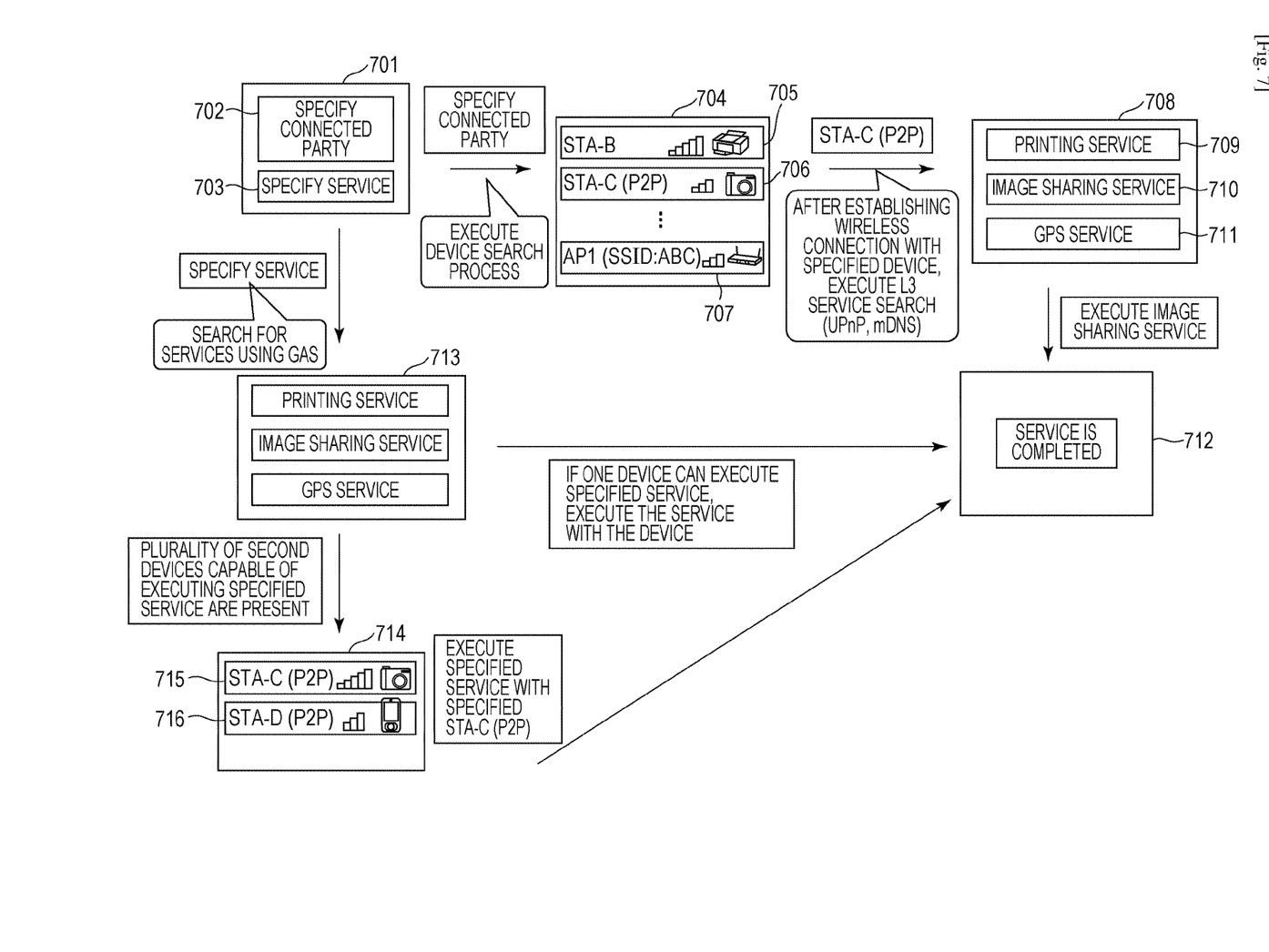
FIG. 7 is a diagram illustrating transition of the user interfaces of the communication devices of the first embodiment.

Next, a sequence for executing a service between the communication devices in FIG. 3 will be described with reference to FIGS. 4, 5, and 7. FIG. 4 is a sequence diagram in the case where the user selects a connected party for wireless communication in the selection unit 212 of the communication device A31. FIG. 7 is a diagram illustrating transition of the user interfaces of the communication devices according to this embodiment. When the control unit 102 of the communication device A31 detects a flag indicating that a communication mode for performing communication is set in response to a user instruction to the operation unit 109, the control unit 102 displays a selection menu including options, as shown in a display screen 701 in FIG. 7, on the display unit 105 (F401). The example display screen 701 in FIG. 7 displays at least two options, that is, an icon 702 for specifying a connected party and executing wireless communication and an icon 703 for specifying a service and executing wireless communication. Another option other than the icons 702 and 703 may be provided. For example, an icon for receiving an instruction to specify a communication system and to execute wireless communication may be further provided. The sequence shown in FIG. 4 will be described on the assumption that the operation unit 109 of the communication device A31 has received a user instruction to the icon 702 for specifying a connected party and executing wireless communication. The selection unit 212 selects to specify a connected party and to execute wireless communication on the basis of the user operation (F402).

When the selection unit 212 of the communication device A31 selects to specify a connected party and to execute wireless communication, the discovery control unit 202 sends a probe request by broadcast transmission to search for second communication devices present in a wireless communication area (F403). The communication device A31 detects the communication device B32, the communication device C33, the communication device D34, and the communication device E35 by receiving probe responses, which are response signals to the transmitted probe request (F404). Although not shown in FIG. 7, information indicating that a search process of the discovery control unit 202 is in execution, for example, "searching", may be displayed during the search process. Upon completion of the search process of the discovery control unit 202, the communication device A31 displays a list of the results of the search on the display unit 105 to enable the user to select a partner communication device, as shown on a display screen 704 in FIG. 7 (F405). The display screen 704 displays e.g. the identifiers and the device names of the devices detected by the search process of the discovery control unit 202, like an icon 705. Furthermore, a communication protocol that the detected device supports may be displayed in association with the identifier and the device name of the device, like an icon 706. The icon 706 displays "STA-C (P2P)", which shows that STA-C is a P2P device. In other words, the icon 706 shows that STA-C supports a Wi-Fi Direct protocol. Furthermore, like an icon 707, the identifier of a network that the detected device connects to in association with the identifier and the device name of the detected device, such as "AP 1 (SSID: ABC)". The icons 705 to 707 display indicators showing the electric field strengths of signals received from the devices that the individual icons 705 to 707 show. The icons 705 to 707 further include information indicating the type of the devices represented by the individual icons 705 to 707. For example, in the example shown on the display screen 704, the type of the device represented by the icon 705 is a printer, the type of the device represented by the icon 706 is a digital camera, and the type of the device represented by the icon 707 is an access point. By displaying such information, the user can determine to which device is to be connected.

The first specification unit 213 of the communication device A31 receives specification of a connected party by selection of an icon displayed on the display screen 704 based on a user operation on the operation unit 109 (F406). The sequence shown in FIG. 4 assumes that the communication device C33 is specified as a connected party. The communication device A31 executes the process of wireless connection with the specified device (F407). In the wireless connection process in F407, if the partner communication device supports Wi-Fi Direct, the communication device A31 forms a P2P group together with the partner communication device in conformity with the specifications of Wi-Fi Direct and establishes connection in a wireless LAN layer and an IP layer. In other words, the Wi-Fi Direct control unit 203 executes the process of determining which role is to be given, GO or CL, and a communication-parameter sharing process in conformity with the specifications of Wi-Fi Direct.

If the wireless connection has succeeded, the communication device A31 starts a service search with the L3-SD control unit 205. The L3-SD control unit 205 executes a second detection process for detecting services that the partner communication device can execute, on the basis of communication in the second communication layer different from the first communication layer (F408). In this description, if a connected party is specified and execution of wireless communication is specified, the service search process in the first communication layer using the service-discovery control unit 204 is not performed. This is because, since the service search process in the first communication layer is an optional function of Wi-Fi Direct, the partner communication device sometimes does not support it. Accordingly, if the service search process in the first communication layer is executed in the case where the specified connected party does not support the service discovery function, the processing time is of no use, thus reducing the ease of user operation. However, even if a connected party is specified and wireless communication is selected, the service search process in the first communication layer may be performed together in the case where information that can be obtained only by the service search process in the first communication layer.

In this description, the L3-SD control unit 205 performs the service search process in the second communication layer by using a search communication protocol SSDP defined in UPnP. SSDP is an abbreviation for Simple Service Discovery Protocol. The L3-SD control unit 205 transmits a service search signal called M-Search in SSDP to obtain service information that the connected partner communication device provides. The service search may be executed using mDNS. In the case where the specified connected party is a network or a communication device constituting a network, the L3-SD control unit 205 can execute the service search process to all devices that belong to the network.

The L3-SD control unit 205 obtains service information that the partner communication device can execute from a response signal to the transmitted service search signal (F409). Then, the second display control unit 211 performs display control to cause the display unit 105 to display services that the partner communication device can execute, as shown on a display screen 708 in FIG. 7, on the basis of the results of service search (F410). Icons 709 to 711 on the display screen 708 are services that the partner communication device can execute. The example shown on the display screen 708 shows that the partner communication device supports "printing service", "image sharing service (image transfer service)", and "GPS service". In displaying a list of service search results, services that the first communication device does not support may not be displayed even if the services can be executed by the partner communication device. For example, if the partner communication device can execute a moving-image distribution service but the first communication device cannot execute the moving-image distribution service, an icon representing the moving-image distribution service is not displayed.

Next, the second specification unit 214 of the communication device A31 receives specification of a service to be executed by selecting of an icon displayed on the display screen 708 based on a user operation on the operation unit 109 (F411). When a service to be executed is specified, the service providing unit 208 or the service using unit 209 controls the service executing unit 110 to execute wireless communication for executing the service with the partner communication device (F412). Upon completion of the service, a display showing that the service has been completed, as shown on a display screen 712 in FIG. 7, is presented, and the process ends.

Next, a sequence of a case where specification of a service to be executed and execution of wireless communication are selected by the selection unit 212 of the communication device A31 will be described with reference to FIG. 5. First, in the case where a communication mode is set on the basis of a user instruction, the communication device A31 displays a selection menu including options, as shown on the display screen 701 in FIG. 7, on the display unit 105 (F501). The sequence shown in FIG. 5 will be described on the assumption that the operation unit 109 of the communication device A31 has received a user instruction on the icon 703 for specifying a service to be executed and executing wireless communication. The selection unit 212 selects to specify a service to be executed and to perform wireless communication on the basis of the user operation (F502).

When the selection unit 212 of the communication device A31 selects to specify a service and to execute wireless communication, the discovery control unit 202 searches for second communication devices present in a wireless communication area (F503). The communication device A31 searches for the second communication devices by transmitting a probe request and receiving probe responses, which are response signals to the signal. In the example shown in FIG. 5, the communication device A31 detects the communication device B32, the communication device C33, the communication device D34, and the communication device E35 by receiving probe responses from the communication devices B32, C33, D34, and E35, respectively (F504). Although not shown in FIG. 7, information indicating that a search process of the discovery control unit 202 is in execution, such as "searching", may be displayed during the search process. Upon completion of the search process of the discovery control unit 202, the service-discovery control unit 204 of the communication device A31 starts a service search process (service discovery) in a wireless LAN layer for the devices detected by the search process (F505). Specifically, the service-discovery control unit 204 sends SD Query, which is a service search signal, to the devices detected by the search process using unicast transmission. The SD Query may be sent using unicast transmission only to devices ready for Wi-Fi Direct on the basis of information elements contained in received probe responses. This is because a device that does not support Wi-Fi Direct cannot cope with the service discovery function. In the example shown in FIG. 5, the communication device B32, communication device C33, communication device D34, communication device E35 are detected by the search process in F503. It is determined from the information elements contained in the probe responses received from the detected devices B32, C33, D34, and E35 that the communication device B32 does not support Wi-Fi Direct. Accordingly, in F505, the service-discovery control unit 204 sends SD Query, which is a service search signal, to the communication device C33, the communication device D34, and the communication device E35 using unicast transmission.

Next, the service-discovery control unit 204 waits for reception of a response signal to the service search signal (F506). In the example shown in FIG. 5, since the communication device C33 and the communication device D34 support service discovery, the communication devices C33 and D34 return SD responses to the communication device A31. On the other hand, since the communication device B32 does not support service discovery, which is an optional function, the communication device B32 does no response thereto even when receiving the SD Query. Upon receiving the SD Response, the communication device A31 obtains information on executable service. Next, the first display control unit 210 performs display control to cause the display unit 105 to display services that the second communication devices can execute, as shown on a display screen 713 in FIG. 7, on the basis of service detection results in the first communication layer (F507).

The services displayed on the display screen 713 are executable services that the SD Responses received in F506 indicate. In the example shown in FIG. 5, although SD Responses are received from the communication device C33 and the communication device D34, the display screen 713 displays a list of services that the communication device C33 and the communication device D34 can individually execute. The example shown on the display screen 713 shows that devices that support "printing service", "image sharing service (image transfer service), and "GPS service" are present, which are determined from the SD Responses received in F506. In displaying a list of service search results, services that the first communication device does not support may not be displayed even if the services can be executed by the second communication devices. For example, if the first communication device cannot execute a printing service, although a second communication device can execute the printing service, an icon representing the printing service is not displayed.

Next, the second specification unit 214 of the communication device A31 receives specification of a service to be executed by selection of an icon displayed on the display screen 713 based on a user operation on the operation unit 109 (F508). When a service to be executed is specified, the communication device A31 determines whether a plurality of devices capable of executing the service are present. In the example shown in FIG. 5, only the communication device D34 can execute the specified service. A process in the case where a plurality of devices capable of executing the specified service are present will be described later.

Next, the communication device A31 executes the process of establishing wireless connection with the device capable of executing the specified service (F509). In the wireless connection process in F509, if the partner communication device supports Wi-Fi Direct, the communication device A31 forms a P2P group together with the partner communication device in conformity with the specifications of Wi-Fi Direct and establishes connection in the wireless LAN layer and the IP layer. In other words, the Wi-Fi Direct control unit 203 executes the process of determining which role is to be given, GO or CL, and a communication-parameter sharing process in conformity with the specifications of Wi-Fi Direct.

If the wireless connection process has succeeded, the service providing unit 208 or the service using unit 209 of the communication device A31 controls the service executing unit 110 to execute wireless communication with the partner communication device for executing the service (F510). Upon completion of the service, a display indicating that the service has been completed, as shown on the display screen 712 in FIG. 7, and the process ends.

Thus, according to this embodiment, this embodiment inquires of the user whether to specify a connected party first or specify a service to be executed first before executing the communication service. An example of the case where a connected party is specified first is a case where the user wants to connect to a specific device to execute a plurality of services. In this case, it is desirable to reliably obtain information on services that the specified device can execute, and there is no need to connect to a plurality of devices. Accordingly, a service search process in a higher communication layer, such as UPnP, is performed without executing service discovery, which is an optional function, and the results of the service search process are notified to the user. Thus, the first communication device executes a connection process with only one device, which takes not so much time that the user operability may be impaired, thus improving the reliability in obtaining information on services that the specified device can execute.

In contrast, an example of the case where a service to be executed is specified first is a case where importance is placed on immediate execution of the specified service rather than what device the service is to be executed with. An example is that the user wants to print images stored in a digital camera in an environment in which a plurality of printers are present in the surroundings, and the user does not consider which printer is to be used for printing. Another example of the case where a service to be executed is specified first is a case where the service is repeatedly executed in a plurality of devices. An example is that travel photos are shared by a plurality of persons. In such a case, it is desirable that at least one device capable of executing a specified service be detected first, and the service be immediately executed with the device. Accordingly, the communication device of this embodiment performs service discovery in a wireless communication layer capable of efficiently executing a specified service, even if it is an optional function, and notifies the user of the results of the search process of the service discovery. This allows more efficient detection of second communication devices capable of a specified service than sequential communication connection with a plurality of devices to perform a service search process in a higher communication layer, such as UPnP. Accordingly, in the case where service searches are performed in different communication layers, the service search results can be displayed so that the user convenience can be improved.

Figure 6:
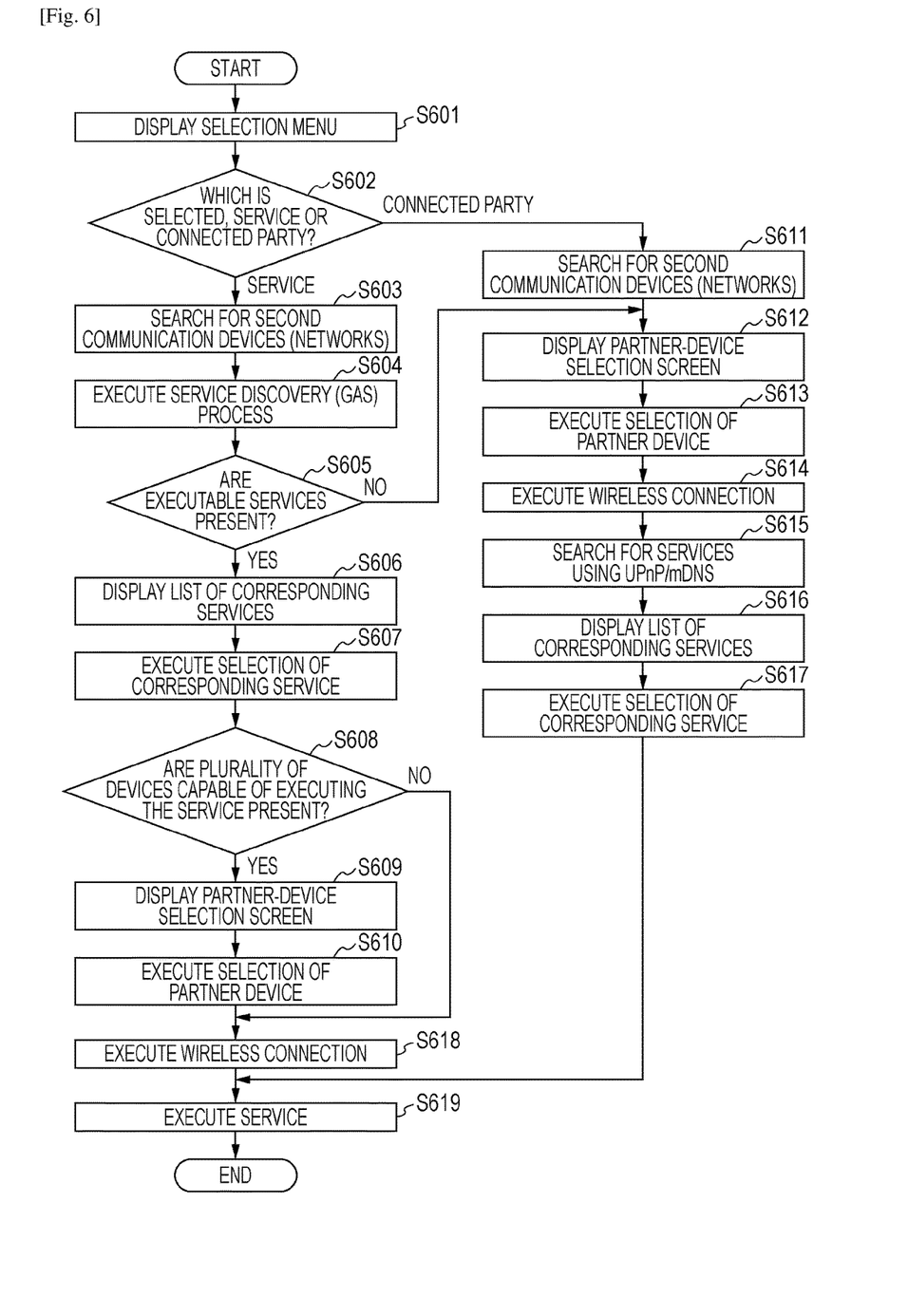
FIG. 6 is a flowchart of the operation of the communication device of the first embodiment.

Next, the above process executed by the communication device A31 will be described with reference to the flowchart in FIG. 6. The process of the flowchart shown in FIG. 6 is implemented by the control unit 102 executing the control program stored in the storage unit 103, controlling the individual hardware components, and calculating and processing information.

First, in S601, when the control unit 102 of the communication device A31 detects a flag indicating that a communication mode for performing communication on the basis of a user instruction on the operation unit 109 is set, the control unit 102 displays a selection menu including options, as shown on the display screen 701 in FIG. 7, on the display unit 105. The display unit 105 displays the selection menu by the control unit 102 storing image data corresponding to the display screen 701 from the storage unit 103 into a VRAM. In S602, it is determined in the selection unit 212 which of a first option for specifying a service to be executed and performing wireless communication and a second option for specifying a connected party and performing wireless communication is selected. In S602, if it is determined that the second option for specifying a connected party and performing wireless communication is selected, the process moves to S611. Here, the control unit 102 determines whether a flag indicating that the icon 702 or the icon 703 is operated using the operation unit 109 is detected.

In S611, the discovery control unit 202 sends a probe request by broadcast transmission to search for second communication devices (or networks) present in a wireless communication area. The control unit 102 transmits, to the wireless communication unit 104, a signal to send a probe request by broadcast transmission. The wireless communication unit 104 generates a signal for the probe request, which is a broadcast signal, in response to the instruction from the control unit 102. The antenna control unit 107 performs control so as to radiate radio signals which are modulated from the broadcast signal indicating the probe request on the basis of IEEE802.11 series via the antenna 108. Upon completion of the search process of the discovery control unit 202, in S612, the communication device A31 displays a list of the results of the search process on the display unit 105, as shown on the display screen 704 in FIG. 7, to allow the user to select a partner communication device. The control unit 102 stores image data corresponding to the display screen 704 from the storage unit 103 into a VRAM, thereby switching the display of the display unit 105.

In S613, the first specification unit 213 receives specification of a connected party by the selection of an icon displayed on the display screen 704 on the basis of a user operation on the operation unit 109. The control unit 102 determines whether a flag indicating that an area showing one of the icons 705 to 707 is operated by the operation unit 109 is detected. In S614, the communication device A31 executes the process of wireless connection with the specified device. Upon the wireless connection process has succeeded, a service search is started by the L3-SD control unit 205 in S615. The L3-SD control unit 205 executes the second detection process for detecting services that the partner communication device can execute, on the basis of communication in the second communication layer different from the first communication layer. The control unit 102 transmits, to the wireless communication unit 104, a signal to send a message for the service search in the second communication layer, such as UPnP or mDNS. The wireless communication unit 104 generates the message for the service search in the second communication layer, such as UPnP or mDNS, in response to the instruction from the control unit 102. The antenna control unit 107 performs control so as to radiate radio signals which are modulated from the message on the basis of the IEEE802.11 series via the antenna 108. Next, in S616, the second display control unit 211 performs display control to cause the display unit 105 to display services that the partner communication device can execute, as shown on the display screen 708 in FIG. 7, on the basis of the results of the service search. The control unit 102 stores image data corresponding to the display screen 708 into a VRAM from the storage unit 103, thereby switching the display of the display unit 105.

In S617, the second specification unit 214 receives specification of a service to be executed by the selection of an icon displayed on the display screen 708 on the basis of a user operation on the operation unit 109. The control unit 102 determines whether a flags indicating that an area showing one of the icons 709 to 711 is operated by the operation unit 109 is detected. Next, when a service to be executed is specified, in S619, the service providing unit 208 or the service using unit 209 controls the service executing unit 110 to execute wireless communication for executing the service with the partner communication device. For example, the control unit 102 provides information communicated via the wireless communication unit 104 to the service executing unit 110. The service executing unit 110 executes the service using the provided information. Here, examples of the service to be executed include a printing service, an image sharing service, and a service for adding positional information to data. Upon completion of the service, a display indicating that the service is completed, as shown on the display screen 712 in FIG. 7, is presented, and the process ends. The control unit 102 stores image data corresponding to the display screen 712 from the storage unit 103 into a VRAM, thereby switching the display of the display unit 105.

On the other hand, in S602, if it is determined in the selection unit that the first option for specifying a service to be executed and perform wireless communication is selected, the process moves to S603. In S603, the discovery control unit 202 sends a probe request by broadcast transmission to search for second communication devices (or networks) present in a wireless communication area. The control unit 102 transmits, to the wireless communication unit 104, a signal to send the probe request by broadcast transmission. In response to the instruction from the control unit 102, the wireless communication unit 104 generates a broadcast signal indicating the probe request. The antenna control unit 107 performs control so as to radiate radio signals which are modulated from the broadcast signal indicating the probe request on the basis of IEEE802.11 series via the antenna 108. Upon completion of the search process performed by the discovery control unit 202, in S604, the service-discovery control unit 204 starts a service search process (service discovery) in the first communication layer for the devices detected in the search process. The control unit 102 transmits, to the wireless communication unit 104, a signal to send an SD Query frame. The wireless communication unit 104 generates a signal indicating the SD Query frame in response to the instruction from the control unit 102. The antenna control unit 107 performs control so as to radiate radio signals modulated from the signal indicating the SD Query frame on the basis of IEEE802.11 series via the antenna 108.

Next, in S605, the service-discovery control unit 204 determines whether a second communication device that can execute services that the first communication device can execute is present on the basis of reception of a response signal to the service search signal. The control unit 102 determines whether the service detected by the service search process is present in table data stored in the storage unit 103, which indicates services that the first communication device can execute. In S605, if no second communication device capable of executing the services that the first communication device can execute is detected, the process moves to S612. This is for the purpose of detecting devices, in the surroundings, that support the service search process in the second communication layer, such as UPnP or mDNS, and thus capable of executing the desired service, although not capable of executing service discovery.

In contrast, in S605, if a second communication device capable of executing the services that the first communication device can execute is present, the process moves to S606. In S606, the first display control unit 210 performs display control to cause the display unit 105 to display services that the second communication device can execute on the basis of the service search results in the first communication layer, as shown on the display screen 713 in FIG. 7. The control unit 102 switches the display of the display unit 105 by storing image data corresponding to the display screen 713 into a VRAM from the storage unit 103. In S607, the second specification unit 214 receives specification of a service to be executed by selection of an icon displayed on the display screen 713 based on a user operation on the operation unit 109. The control unit 102 determines whether a flag indicating that an area showing one of icons representing the executable services detected by the operation unit 109 is detected.

If a service to be executed is specified in S607, the communication device A31 determines in S608 whether a plurality of devices capable of executing the service are present. The control unit 102 determines a device capable of executing the service specified in S607 on the basis of the results of the service search performed in S604, which are stored in the storage unit 103. In S608, if it is determined that a plurality of devices capable of executing the service are present, the process moves to S609. In S609, the communication device A31 displays a list of devices capable of executing the specified service on the display unit 105, as shown on a display screen 714 in FIG. 7, so that the user can select a device capable of executing the service. The control unit 102 switches the display of the display unit 105 by storing image data corresponding to the display screen 714 into a VRAM from the storage unit 103. The display in S609 includes the identifiers and the device names of the devices capable of executing the specified service, like the icons 715 and 716 shown on the display screen 714 in FIG. 7. Communication protocols for the devices capable of executing the specified service may be displayed in association with the identifiers or the device names of the devices, like the icons 715 and 716. As shown in the icons 715 and 716, indicators showing the electric field strengths of the signals received from the devices that the individual icons represent are also displayed. The icons 715 and 716 include information indicating the types of the devices represented by the icons. Displaying such information allows the user to easily determine to which device the user should connect.

In S610, the first specification unit 213 receives specification of a connected party by selection of an icon displayed on the display screen 714 based on a user operation on the operation unit 109. The control unit 102 determines whether a flag indicating that an area indicating one of the icons 715 and 716 representing second communication devices is operated is detected. Next, in S618, the communication device A31 executes the process of establishing wireless connection with the device specified in S613. On the other hand, if it is determined in S608 that one device is capable of executing the specified service, the first communication device executes the process of establishing wireless connection with the device (S618). In the wireless connection process in S618, the Wi-Fi Direct control unit 203 executes the process of determining the role, GO or CL, and the process of sharing communication parameters in conformity with the specifications of Wi-Fi Direct.

If the wireless connection process has succeeded, the service providing unit 208 or the service using unit 209 of the communication device A31 controls the service executing unit 110 to execute wireless communication for executing the service with the partner communication device (S619). Upon completion of the service, a display indicating that the service is completed is presented, as shown on the display screen 712 in FIG. 7, and the process ends.

As described above, this embodiment inquires of the user whether to specify a connected party first or specify a service to be executed first before executing the communication service. An example of the case where a connected party is specified first is a case where the user wants to connect to a specific device to execute a plurality of services. In this case, it is desirable to reliably obtain information on services that the specified device can execute, and there is no need to connect to a plurality of devices. Accordingly, a service search process in a higher communication layer, such as UPnP, is performed without executing service discovery, which is an optional function, and the results of the service search process are notified to the user. Thus, the first communication device executes a connection process with only one device, which takes not so much time that the user operability may be impaired, thus improving the reliability in obtaining information on services that the specified device can execute.

In contrast, an example of the case where a service to be executed is specified first is a case where importance is placed on immediate execution of the specified service rather than what device the service is to be executed with. An example is that the user wants to print images stored in a digital camera in an environment in which a plurality of printers are present in the surroundings, and the user does not consider which printer is to be used for printing. Another example of the case where a service to be executed is specified first is a case where the service is repeatedly executed in a plurality of devices. An example is that travel photos are shared by a plurality of persons. In such a case, it is desirable that at least one device capable of executing a specified service be detected first, and the service be immediately executed with the device. Accordingly, the communication device of this embodiment performs service discovery in a wireless communication layer capable of efficiently executing a specified service, even if it is an optional function, and notifies the user of the results of the search process of the service discovery. This allows more efficient detection of second communication devices capable of a specified service than sequential communication connection with a plurality of devices to perform a service search process in a higher communication layer, such as UPnP. Accordingly, in the case where service searches are performed in different communication layers, the service search results can be displayed so that the user convenience can be improved.

Thus, the communication device in this embodiment presents options including at least a first option for specifying a service to be executed and performing wireless communication and a second option for specifying a connected party and performing wireless communication. The communication device then selects a wireless communication to be executed from wireless communication corresponding to the plurality of options including the first option and the second option. The communication device of this embodiment detects services that second communication devices can execute on the basis of communication in the first communication layer. Furthermore, the communication device of this embodiment detects services that the second communication devices can execute on the basis of communication in the second communication layer different from the first communication layer.

If the first option is selected, the communication device of this embodiment displays the results of detection of services that second communication devices can execute based on communication in the first communication layer. If the second option is selected, the communication device displays the results of detection of services based on communication in the second communication layer for a specified connected party.

If the first option is selected, the communication device of this embodiment transmits a service search signal in the first communication layer to second communication devices detected by searching for second communication devices present in a wireless communication area before establishing connection in the first communication layer. The communication device then detects services that the second communication devices can execute from responses to the transmitted service search signal. If the second option is selected, the communication device displays a list of second communication devices detected by searching for second communication devices present in a wireless communication area. Furthermore, if the second option is selected, the communication device specifies one of the plurality of second communication devices detected by searching for second communication devices present in a wireless communication area.

Furthermore, the communication device of this embodiment transmits a service search signal in the second communication layer after establishing connection in the first communication layer with the second communication device specified by the first specification unit. The communication device detects services that the second communication device can execute from a response to the transmitted service search signal. The communication device specifies a service to be executed from the plurality of services detected by communication in the first communication layer. If the communication device can execute the specified service with a plurality of second communication devices, the communication device selects a device that executes the specified service from the plurality of second communication devices.

If the first option is selected, and if a service that the communication device can execute is not detected by the service search in the first communication layer, the communication device of this embodiment executes a service search in the second communication layer. The service search in the first communication layer is executed on the basis of a Generic Advertisement Service (GAS) protocol. The service search in the second communication layer uses either of Universal Plug and Play (UPnP), Bonjour and Multicast Domain Name System (mDNS). The communication device of this embodiment detects services that the second communication devices can execute on the basis of wireless communication conforming to IEEE802.11 series. The communication device detects services that the second communication devices can execute on the basis of the Wi-Fi Direct protocol.

Second Embodiment

The present invention can be implemented by executing the following process. Specifically, software (program) for implementing the functions of the above embodiment is provided to a system or device via a network or various kinds of storage media. Then, a computer (or CPU, MPU, etc.) of the system or device reads a program.

This embodiment allows a communication mode to be selected so as to improve user convenience.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-096410, filed May 1, 2013, which is hereby incorporated by reference herein in its entirety.

The invention claimed is:

1. A communication device comprising:
 a processor; and
 a memory coupled with the processor, the memory having instructions that, when executed by the processor, perform operations comprising:
 presenting, before the communication device performs a service detection processing, a plurality of options including a first option for specifying a service to be executed and performing wireless communication and a second option for specifying a connected party and performing wireless communication;
 selecting one of the first option and the second option;
 first detecting, in a case where the first option is selected by the selection unit, a service that another communication device is able to execute based on communication in a first communication layer; and
 second detecting, in a case where the second option is selected by the selecting, a service that another communication device is able to execute based on communication in a second communication layer different from the first communication layer,
 wherein, in a case where the first option is selected and where detection of a service that the communication device is able to execute by the first detecting fails, the second detecting is used for detecting the service.

2. The communication device according to claim 1, further comprising:
 first displaying, in a case where the first option is selected, a result of detection performed by the first detecting; and
 second displaying, if the second option is selected, a result of detection performed by the second detecting for a specified connected party.

3. The communication device according to claim 2, further comprising second specifying a service to be executed from the plurality of services detected by the first detecting and displayed by the first displaying.

4. The communication device according to claim 3, further comprising selecting, in a case where the service specified by the second specifying is able to be executed with a plurality of other communication devices, a device that executes the specified service from the plurality of other communication devices.

5. The communication device according to claim 1, further comprising searching for another communication device present in a wireless communication area.

6. The communication device according to claim 5, wherein in a case where the first option is selected, the first detecting transmits a service search signal in the first communication layer to another communication device detected by the search performed by the searching before establishing connection in the first communication layer and detects a service that said another communication device is able to execute from a response to the transmitted service search signal.

7. The communication device according to claim 5, further comprising displaying, in a case where the second option is selected, a list of other communication devices detected by the searching.

8. The communication device according to claim 5, further comprising first specifying, in a case where the second option is selected, one of a plurality of communication devices detected by the searching as a connected party based on a user operation.

9. The communication device according to claim 8, wherein the second detecting transmits a service search signal in the second communication layer after establishing connection in the first communication layer with the other communication device specified by the first specifying and detects a service that the other communication device is able to execute from a response to the transmitted service search signal.

10. The communication device according to claim 1, wherein in a case where the first option is selected and a service that the communication device is able to execute is not detected by the first detecting, the second detecting is used to detect the service.

11. The communication device according to claim 1, wherein the first detecting detects a service that the other communication device is able to execute based on a Generic Advertisement Service (GAS) protocol.

12. The communication device according to claim 1, wherein the second detecting detects a service that the other communication device is able to execute based on any one of Universal Plug and Play (UPnP), Bonjour, and Multicast Domain Name System (mDNS).

13. The communication device according to claim 1, wherein the first detecting detects a service that the other communication device is able to execute based on wireless communication conforming to IEEE802.11 series.

14. The communication device according to claim 1, wherein the first detecting detects a service that the other communication device is able to execute based on a Wi-Fi Direct protocol.

15. A method for controlling a communication device, the method comprising:
presenting, before the communication device performs a service detection processing, a plurality of options including a first option for specifying a service to be executed and performing wireless communication and a second option for specifying a connected party and performing wireless communication;
selecting one of the first option and the second option;
first detecting, in a case where the first option is selected by the selecting, that another communication device is able to execute based on communication in a first communication layer;
second detecting, in a case where the second option is selected by the selecting, that another communication device is able to execute based on communication in a second communication layer different from the first communication layer,
wherein, in a case where the first option is selected and where detection of a service that the communication device is able to execute by the first detecting fails, the second detecting is used for detecting the service.

16. The method according to claim 15, further comprising:
first displaying, in a case where the first option is selected, a result of detection performed by the first detecting; and
second displaying, if the second option is selected, a result of detection performed by the second detecting for a specified connected party.

17. The method according to claim 15, further comprising searching for another communication device present in a wireless communication area.

18. A non-transitory computer readable storage medium storing a computer-executable program of instructions for causing a computer to perform a method comprising:
presenting, before the communication device performs a service detection processing, a plurality of options including a first option for specifying a service to be executed and performing wireless communication and a second option for specifying a connected party and performing wireless communication;
selecting one of the first option and the second option;
first detecting a service, in a case where the first option is selected by the selecting, that another communication device is able to execute based on communication in a first communication layer;
second detecting a service, in a case where the second option is selected by the selecting, that another communication device is able to execute based on communication in a second communication layer different from the first communication layer,
wherein, in a case where the first option is selected and where detection of a service that the communication device is able to execute by the first detecting fails, the second detecting is used for detecting the service.

19. The non-transitory computer readable storage medium according to claim 18, further comprising:
first displaying, in a case where the first option is selected, a result of detection performed by the first detecting; and
second displaying, if the second option is selected, a result of detection performed by the second detecting for a specified connected party.

20. The non-transitory computer readable storage medium according to claim 18, further comprising searching for another communication device present in a wireless communication area.

* * * * *